Figure 11:
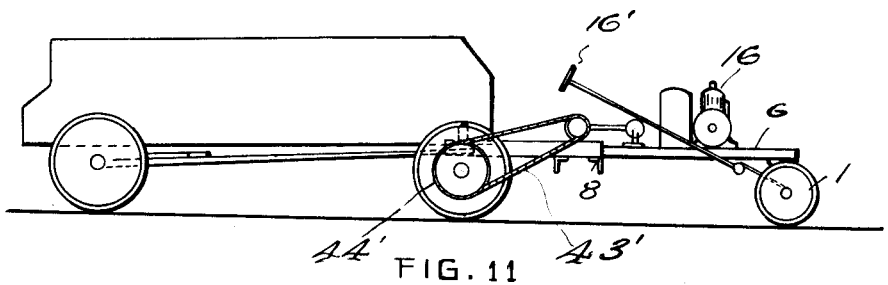

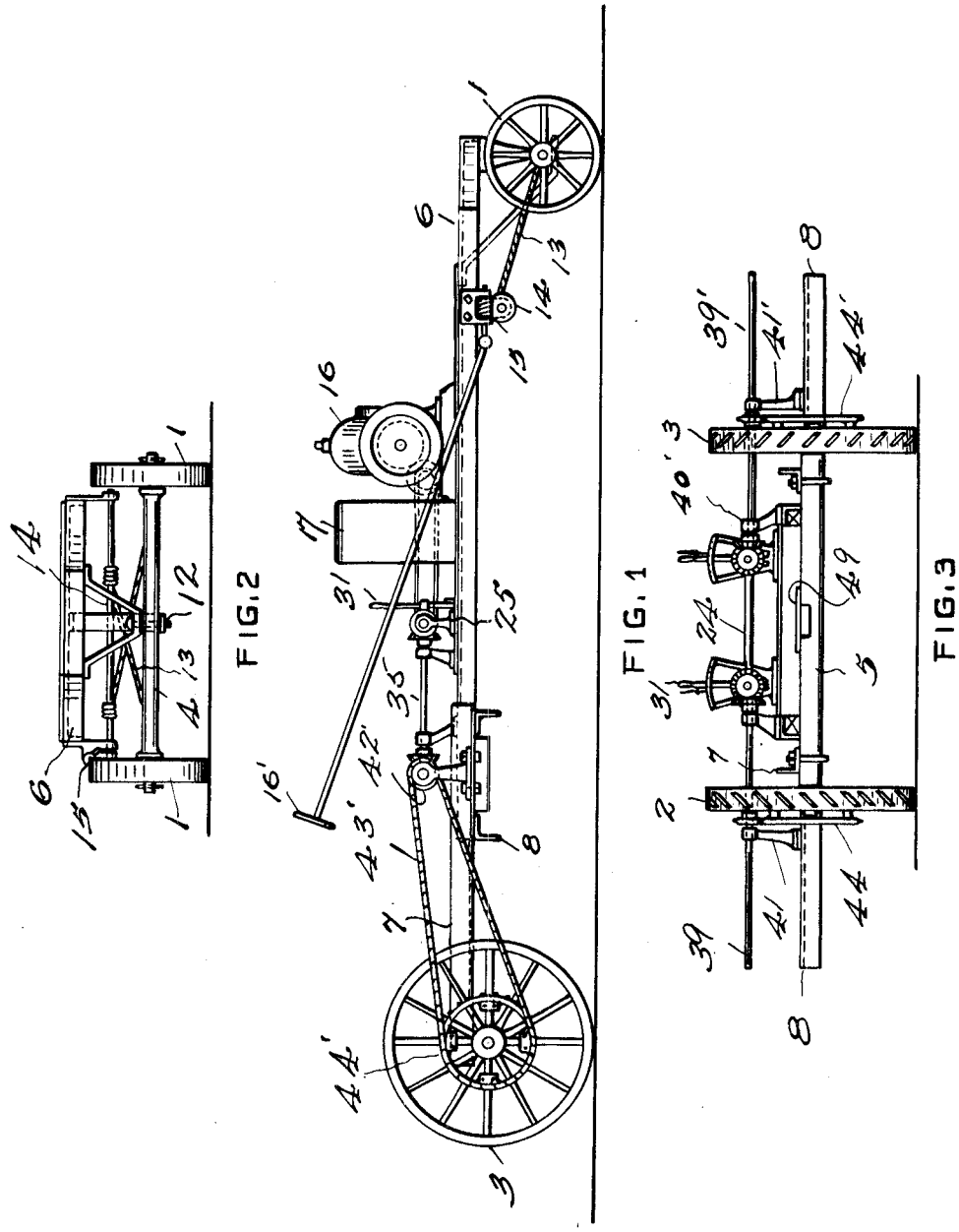

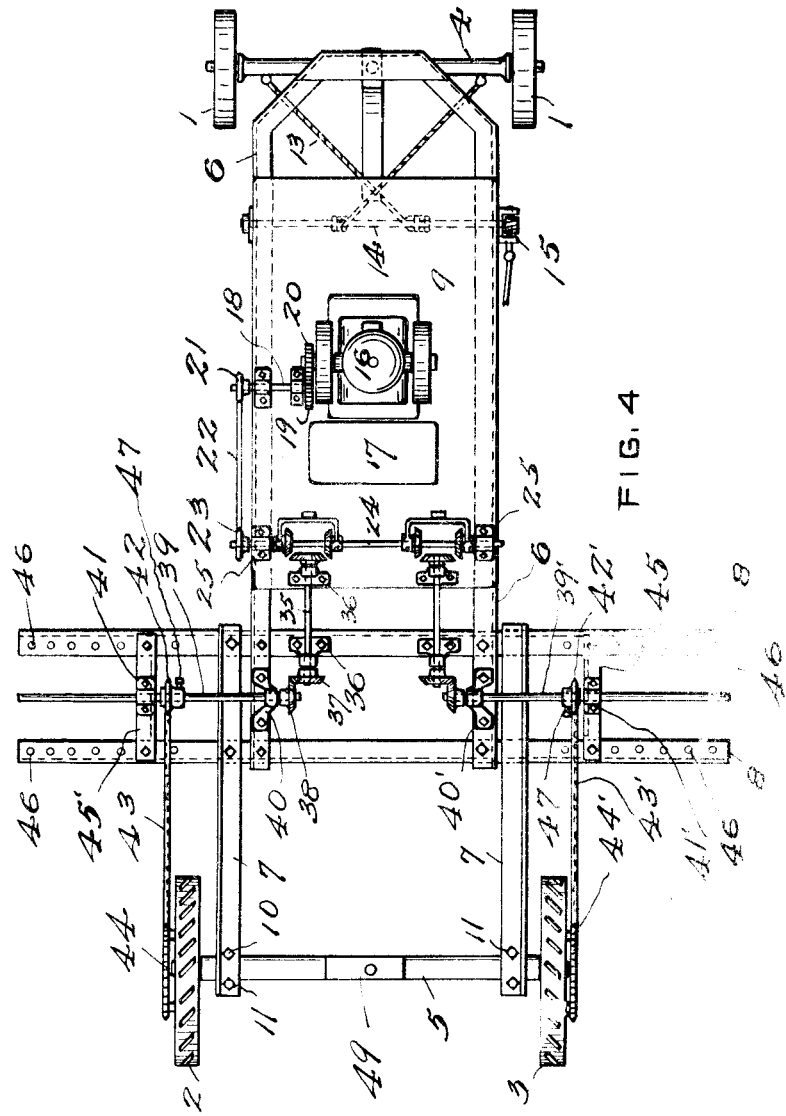

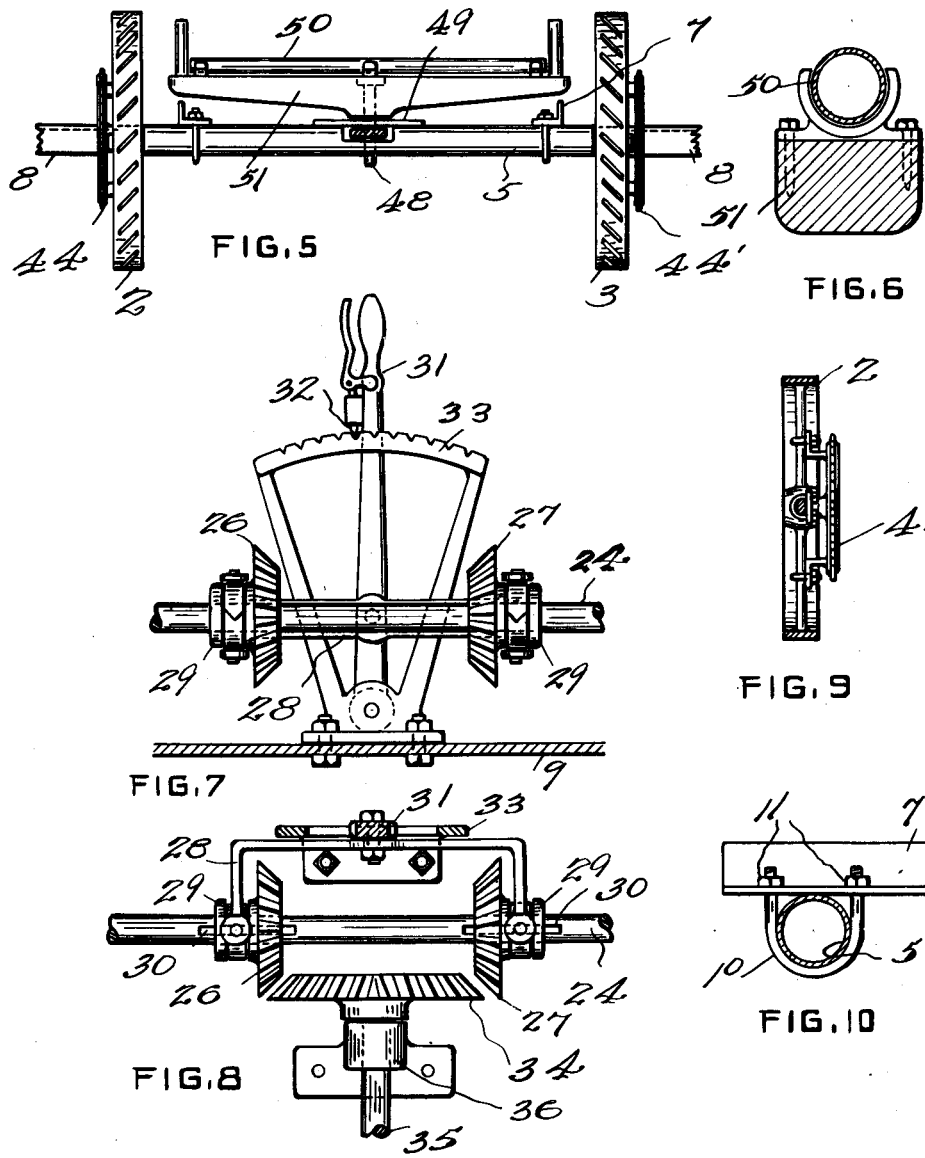

UNITED STATES PATENT OFFICE.

GRANVILLE C. DORT, OF PLAIN CITY, OHIO, ASSIGNOR OF ONE-HALF TO RICHMOND P. DORT, OF WESTERVILLE, OHIO.

TRACTOR.

1,105,551.  Specification of Letters Patent.  Patented July 28, 1914.

Application filed March 3, 1913. Serial No. 751,754.

*To all whom it may concern:*

Be it known that I, GRANVILLE C. DORT, a citizen of the United States, residing at Plain City, in the county of Madison and State of Ohio, have invented certain new and useful Improvements in Tractors, of which the following is a specification.

My present invention relates to improvements in tractors and is designed especially for use in connection with farm vehicles and implements.

The object of the invention is the provision of a unitary structure of the automobile type, which, together with a second unit possessing characteristic features, may be combined to form a combination structure, capable of performing definite functions. I have illustrated the physical embodiment of this conception in several different forms in the drawings, wherein I depict a wagon, a mowing machine, a grain drill, a hay rake, and a roller, all farm implements, and wherein the same unitary structure is illustrated in combination with a second unit of characteristic features.

The invention consists essentially in certain novel combinations and arrangements of parts whereby the tractor is adapted for use with different and various implements, and in the adjustability of parts thereto.

Figure 12:
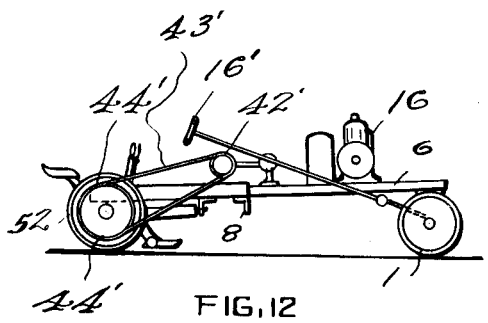
Figure 13:
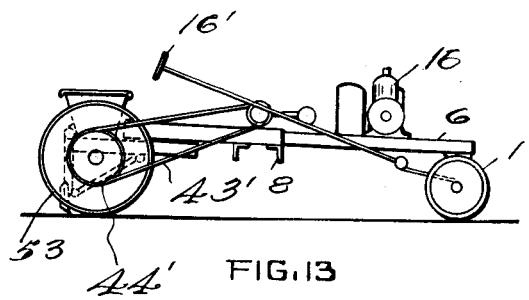
Figure 14:
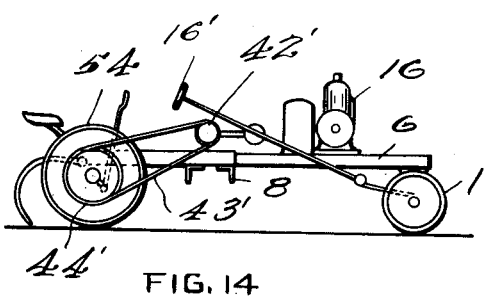
Figure 15:
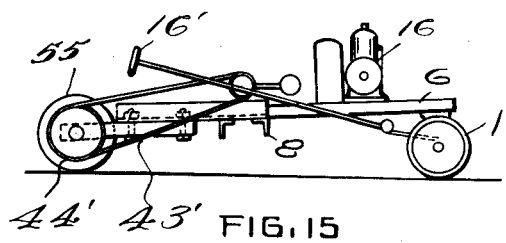

Figure 1 is a side elevation of a tractor embodying the invention. Fig. 2 is a front view of Fig. 1. Fig. 3 is a rear view. Fig. 4 is a plan view of Fig. 1. Fig. 5 is an enlarged rear elevation showing a wagon bolster forming part of the implement when used as a vehicle for transporting goods. Fig. 6 is a sectional view taken transversely through the bolster especially to show the pipe roller which forms a part of the bolster. Fig. 7 illustrates the lever mechanism for the transmission gearing of the automobile. Fig. 8 is a plan view of the transmission gearing of Fig. 7. Fig. 9 is a transverse sectional view of one of the drive wheels and its sprocket. Fig. 10 is a sectional detail view showing the mode of attaching the tractor to an implement. Fig. 11 shows the tractor attached to and forming part of a vehicle or wagon. Fig. 12 shows the same tractor converted for use with a mowing machine. Fig. 13 discloses the unitary structure of the tractor forming an integral part of a grain drill. Fig. 14 depicts the tractor providing the propulsive force for a hay rake. Fig. 15 illustrates the tractor when used in conjunction with a land-roller.

The form of the invention as embodied in Figs. 1, 2, 3, 4, for instance illustrates a vehicle having the front steering wheels 1 and the driving wheels 2 and 3 upon which are supported, by means of the axles or shafts 4 and 5, the front U shaped frame 6, the side bars 7 constituting a rear frame, and the transverse bars 8, 8 forming constituent parts of an intermediate transverse frame extending at each side of the main frame. The main, or front frame, has a deck or floor 9 constructed of suitable material, and the frame members are preferably made up of angle iron, to combine lightness and strength of material. The main frame, the rear frame and the extension frame are all bolted together, as usual, but it will be apparent that, as will be described hereinafter, the rear axle 5 and driving wheels 2, 3, illustrated in Fig. 4 may be removed and other elements of this nature substituted therefor, to adapt the tractor for use with other implements.

Fig. 10 snows in detail section the manner of attaching the bars 7 to the axle 5, a yoke or clip 10 being passed around the cylindrical tubular axle 5, and secured by nuts 11.

The front axle 4 and steering wheels 1, 1, may be revolved upon the center 12 by means of the cables 13 13 which are passed around the drum 14, and actuated by the steering device 15 from the wheel 16', the latter being located in convenient position for the operator.

The tractor being self propelled is provided with a motor 16, illustrated as an internal combustion engine adapted to receive fuel from the tank 17, and the power of the engine is transmitted through the following train of mechanism and gears. The counter shaft 18 at the side of the motor is rotated from the crank shaft of the engine through the medium of the small gears 19 and 20, the latter on the shaft 18. By means of the sprocket 21 on shaft 18, the sprocket chain 22, and the sprocket wheel 23 on shaft 24 are rotated. The shaft 24 is the transmission shaft and is equipped with an independent drive for each of the traction or driving wheels 2, 3. The shaft 24 is journaled in end bearings 25, and is equipped with two sets of transmission gears, one for each drive wheel. Referring to Figs. 7 and 8 particularly, the details of these devices will be clearer. The two bevel gears 26, 27 are slidable on the shaft 24 through the medium of the yoke 28 which is connected to the gears by the spools or sleeves 29, and the gears are keyed to the shaft as indicated at 30. The yoke and its gears may be moved laterally from the lever 31 which is provided with the usual detent 32 to engage the rack 33 and hold the lever in adjusted position. Between the two gears 26 and 27 and adapted to mesh with either of said gears is located the larger gear 34, journaled on the shaft 35. This longitudinal counter shaft 35 is supported in bearings 36 one each on the deck 9 and the other one on one of the bars 8 of the transverse frame. The rear end of the counter shaft 35 is equipped with a bevel gear 37 meshing with the complementary gear 38 on the driving shaft 39 which is journaled in bearings 40 and 41. Through the medium of the sprocket wheel 42, chain 43, and sprocket wheel 44, attached to the wheel 2, the latter wheel is driven, to propel the vehicle over the ground.

The above described mechanism is shown in complementary form at the opposite side of the vehicle to actuate the wheel 3 through the driving shaft 39′ (which is driven from the transverse shaft 24 by mechanism complementary to that which actuates shaft 39 and here will not be described). The shaft 39′ actuates the wheel 3 through the sprocket wheel 42′, chain 43′ and sprocket wheel 44′. The shaft 39′ is supported upon bearings 40 and 41′. It will be observed that the bearings 40, 40′ are secured on the end of the main frame 6, but the outer bearings 41, 41′ are secured on cross plates 45, 45′ which are adapted for adjustment on the extension frame 8 and may be secured thereon by means of bolts passed through the series of perforations 46, 46 provided for the purpose. The sprocket wheels 42 42′ are keyed on their respective shafts 39 39′, and may slide inwardly or outwardly with relation to the bearing 40 or 40′, and secured in adjusted position by a set screw 47.

The extension frame and adjustable plates and bearings supported thereby, enable the operator to adapt the tractor for use in connection with varying widths of implements.

In converting the tractor for use with the body and rear wheels of a wagon as in Figs. 11, 5 and 3, the king bolt 48 (Fig. 5) is passed through the perforated plate 49 of the axle 5, and the wagon body is supported on the pipe roller 50 of the bolster 51.

In Figs. 12, 13, 14, 15 the tractor or drive wheels 2 and 3 have been detached, and the comparatively small wheels 52 of the mowing machine are driven from the sprocket wheel, as 42′. Again, the grain drill of Fig. 13, the hay rake of Fig. 14 and the roller of Fig. 15 are each driven from the sprockets 42 and 42′ by means of their respective wheels 53, 54, and the roller 55. The independent drive of the separate wheels 2 and 3 enables the operator to make a short turn when driving. Thus, by throwing in or out the transmission gearing, the wheel 2 may be driven forward, and the wheel 3 be driven backward, or one wheel may remain impotent while the other is driven in either direction.

By moving the sprocket wheels on the shafts 39 39′, and if necessary the bearing supporting plates 45 45′, the chains 43 and 43′ may be placed around sprocket wheels on traction wheels of greater or less tread or gage, as will be understood.

The front wheels 1, 1, are purposely made small in diameter in order that they may pass under the frame 6. The sprockets 44, 44′ are portable, and may be attached to any of the wheels 52, 53, 54, or, roller 55.

Having thus described my invention, what I claim is:—

The combination in a tractor of a front frame and a motor supported thereon, a rear frame having traction wheels with driving sprockets, and a pair of intermediate transverse bars connecting said frames and extending beyond the sides of the frames, a transmission shaft on the front frame actuated from the motor, a pair of independent counter shafts actuated from the transmission shaft, a driving shaft for each countershaft operatively connected to the sprocket wheels, and each said driving shaft having a bearing adjustable on the transverse bars.

In testimony whereof I affix my signature in presence of two witnesses.

GRANVILLE C. DORT.

Witnesses:
C. M. SHIGLEY,
G. A. WEAVER.